United States Patent
Sampei et al.

(10) Patent No.: US 10,409,663 B2
(45) Date of Patent: Sep. 10, 2019

(54) STORAGE SYSTEM AND CONTROL APPARATUS

(71) Applicant: FUJITSU LIMITED, Kawasaki-shi, Kanagawa (JP)

(72) Inventors: Akira Sampei, Kawasaki (JP); Fumio Hanzawa, Yokohama (JP); Hiroaki Sato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 205 days.

(21) Appl. No.: 15/080,748

(22) Filed: Mar. 25, 2016

(65) Prior Publication Data
US 2016/0321123 A1    Nov. 3, 2016

(30) Foreign Application Priority Data

Apr. 30, 2015  (JP) .................. 2015-093349

(51) Int. Cl.
| | |
|---|---|
| *G06F 11/07* | (2006.01) |
| *G06F 11/10* | (2006.01) |
| *G06F 11/14* | (2006.01) |
| *G06F 11/20* | (2006.01) |
| *G06F 11/00* | (2006.01) |

(52) U.S. Cl.
CPC ............ *G06F 11/076* (2013.01); *G06F 11/00* (2013.01); *G06F 11/079* (2013.01); *G06F 11/0727* (2013.01); *G06F 11/1076* (2013.01); *G06F 11/1402* (2013.01); *G06F 11/20* (2013.01)

(58) Field of Classification Search
CPC .. G06F 11/076; G06F 11/073; G06F 11/1068; G06F 11/2094
See application file for complete search history.

(56) References Cited

U.S. PATENT DOCUMENTS

| | | | |
|---|---|---|---|
| 6,098,179 A * | 8/2000 | Harter, Jr. | ............... H04L 1/24 714/18 |
| 2004/0205381 A1 | 10/2004 | Sakai | |
| 2005/0160311 A1* | 7/2005 | Hartwell | ............ G06F 11/073 714/6.32 |
| 2007/0174719 A1 | 7/2007 | Inoue et al. | |

(Continued)

FOREIGN PATENT DOCUMENTS

| | | |
|---|---|---|
| JP | H06-051915 A | 2/1994 |
| JP | 2004-252692 A | 9/2004 |
| JP | 2007-141185 A | 6/2007 |

*Primary Examiner* — Jigar P Patel
(74) *Attorney, Agent, or Firm* — Fujitsu Patent Center

(57) ABSTRACT

A first control apparatus transmits, to a second control apparatus, a first error score based on an error detection situation at the time of accessing a first memory device through the second control apparatus, and transmits, to a third control apparatus, a second error score based on an error detection situation at the time of accessing a second memory device through the third control apparatus. The second control apparatus determines whether the first memory device malfunctions, based on a sum of a third error score based on the error detection situation at the time of accessing the first memory device and the received first error score. The third control apparatus determines whether the second memory device malfunctions, based on a sum of a fourth error score based on the error detection situation at the time of accessing the second memory device and the received second error score.

8 Claims, 13 Drawing Sheets

(56) References Cited

U.S. PATENT DOCUMENTS

2009/0282210 A1* 11/2009 Heyrman ................ G06F 13/28
711/173
2016/0283303 A1* 9/2016 Sharma ................ G06F 11/079

* cited by examiner

| RAID GROUP | MEMBER DISK | STATUS | RAID CONTROL RESPONSIBLE CM | DISK ACCESS CONTROL RESPONSIBLE CM | SUMMATION RESPONSIBLE CM |
|---|---|---|---|---|---|
| RLU#0 | DISK#0000 | true | CM#2 | CM#0 | CM#0 |
| RLU#0 | DISK#1000 | true | CM#2 | CM#1 | CM#1 |
| ... | ... | ... | ... | ... | ... |

114a RAID MANAGEMENT TABLE

FIG. 7

114b ERROR MANAGEMENT TABLE

| DISK NUMBER | ERROR SCORE | TRANSFER THRESHOLD VALUE | ERROR DETECTION CM |
|---|---|---|---|
| DISK#0000 | 50 | 0 | CM#0, CM#2 |
| DISK#1000 | 0 | 0 | - |
| ... | ... | ... | ... |

FIG. 8

114c SUMMATION TABLE

| DISK NUMBER | CUMULATIVE ERROR SCORE | DISCONNECTION THRESHOLD VALUE |
|---|---|---|
| DISK#0000 | 100 | 256 |
| DISK#0001 | 0 | 256 |
| ... | ... | ... |

FIG. 9

STORAGE SYSTEM AND CONTROL APPARATUS

CROSS-REFERENCE TO RELATED APPLICATION

This application is based upon and claims the benefit of priority of the prior Japanese Patent Application No. 2015-093349, filed on Apr. 30, 2015, the entire contents of which are incorporated herein by reference.

FIELD

The embodiments discussed herein relate to a storage system and a control apparatus.

BACKGROUND

Many control apparatuses for controlling access to memory devices, such as hard disk drive (HDD), have a function for monitoring occurrence of an error in access to the memory device and a function for recording such occurrence as an error score according to the type of the error. When the error score reaches a certain value, these control apparatuses determine that malfunction has occurred in the memory device, and take a measure such as disconnecting the memory device.

Also, the next storage system is proposed as an example of a storage system having a function for monitoring a failure that might occur in the memory device. In this storage system, a connection control unit connects a communication control unit with a plurality of storage devices by means of a switch. The connection control unit transmits error information to the communication control unit upon recognizing a failure in access to a storage device, and decides whether the communication control unit is to execute a failure recovery process on the basis of the error information.

Also, the next disk array is proposed, for example. In this example, a disk device including a disk array has a function for collecting and retaining its operation history information, as well as a function for transferring the operation history information to a higher-level control apparatus in response to a transfer request from the higher-level control apparatus.

See, for example, Japanese Laid-open Patent Publication Nos. 2007-141185 and 6-51915.

In recent years, storage systems tend to include an increasing number of control apparatuses for controlling access to memory devices, so as to enlarge the scale of the storage system. Also, there is a need for diversifying access routes and access control systems in addition to the scale enlargement, and for example it is considered that a certain control apparatus accesses a memory device via another control apparatus. In this configuration, it is possible that an error in access to one memory device is detected by all control apparatuses. In this case, if each individual control apparatus detects failures of memory devices, the failures are unable to be detected with respect to each memory device.

Also, when memory devices accessed from a plurality of control apparatuses are managed by one control apparatus, there is a problem that a processing load of the control apparatus for managing the memory devices increases, affecting the primary process of the control apparatus, i.e., controlling access to the memory devices.

SUMMARY

According to one aspect, there is provided a storage system including: a first memory device; a second memory device; a first control apparatus; a second control apparatus; and a third control apparatus, wherein the first control apparatus includes: a first memory configured to store a first error score and a second error score, and a first processor configured to calculate the first error score on the basis of an error detection situation at a time of accessing the first memory device through the second control apparatus to store the calculated first error score in the first memory, and calculate the second error score on the basis of an error detection situation at a time of accessing the second memory device through the third control apparatus to store the calculated second error score in the first memory, and transmit the first error score to the second control apparatus at a predetermined time, and transmit the second error score to the third control apparatus at a predetermined time, wherein the second control apparatus includes: a second memory configured to store a third error score, and a second processor configured to calculate the third error score on the basis of an error detection situation at a time of accessing the first memory device to store the calculated third error score in the second memory, and determine whether the first memory device malfunctions on the basis of a sum of the first error score received from the first control apparatus and the third error score, wherein the third control apparatus includes: a third memory configured to store a fourth error score, and a third processor configured to calculate the fourth error score on the basis of an error detection situation at a time of accessing the second memory device to store the calculated fourth error score in the third memory, and determine whether the second memory device malfunctions on the basis of a sum of the second error score received from the first control apparatus and the fourth error score.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an exemplary configuration of a RAID management table;

FIG. 8 illustrates an exemplary configuration of an error management table;

FIG. 9 illustrates an exemplary configuration of a summation table;

DESCRIPTION OF EMBODIMENTS

Figure 1:
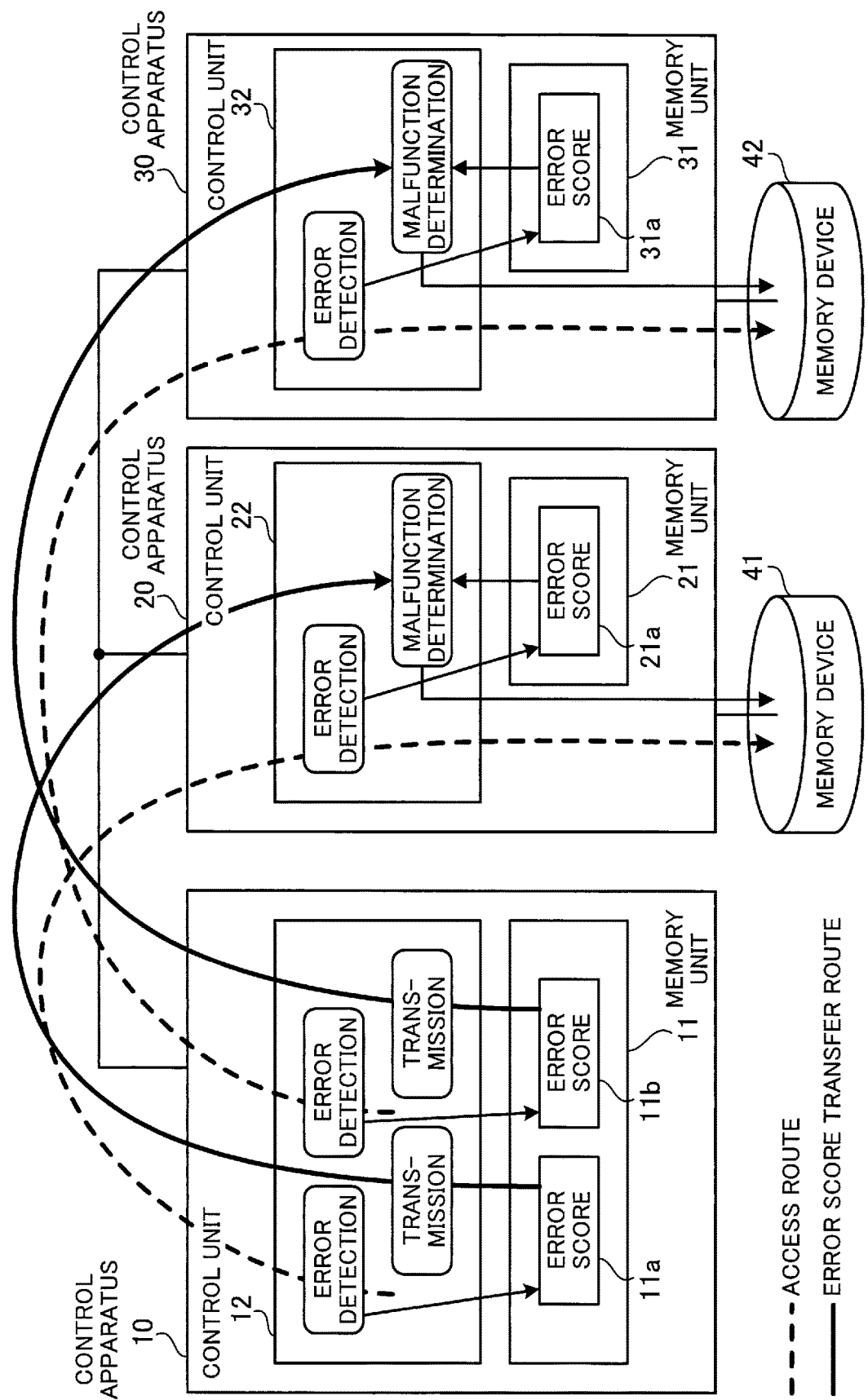
FIG. 1 illustrates an exemplary configuration and an exemplary process of a storage system according to a first embodiment.

Several embodiments will be described below with reference to the accompanying drawings, wherein like reference numerals refer to like elements throughout.

First Embodiment

FIG. 1 illustrates an exemplary configuration and an exemplary process of a storage system according to the first embodiment. The storage system illustrated in FIG. 1 includes control apparatuses 10, 20, and 30 and memory devices 41 and 42.

The control apparatus 20 can access the memory device 41. On the other hand, the control apparatus 10 can access the memory device 41 through the control apparatus 20. For example, the control apparatus 10 accesses the memory device 41 by transmitting an access request for the memory device 41 to the control apparatus 20.

The control apparatus 30 can access the memory device 42. On the other hand, the control apparatus 10 can access the memory device 42 through the control apparatus 30. For example, the control apparatus 10 accesses the memory device 42 by transmitting an access request for the memory device 42 to the control apparatus 30.

In this configuration, both of the control apparatuses 10 and 20 can detect an error occurring when accessing the memory device 41. For example, the control apparatus 10 can detect an error in data read from the memory device 41. For example, the control apparatus 20 can detect a spin-up error of the memory device 41 (if the memory device 41 is an HDD), a media error of the memory device 41, and the like, in addition to the error in data read from the memory device 41.

The control apparatus 10 manages an error occurrence situation at the time of accessing the memory device 41, by using an error score 11a. On the other hand, the control apparatus 20 manages an error occurrence situation at the time of accessing the memory device 41, by using an error score 21a. The error scores 11a and 21a are used to determine whether the memory device 41 malfunctions. Hence, one of the control apparatuses 10 and 20 needs to add up the error scores 11a and 21a, in order to determine such malfunction on the basis of the result of addition (summation).

Also, in the same way, in the above configuration, both of the control apparatuses 10 and 30 can detect errors when accessing the memory device 42. The control apparatus 10 manages an error occurrence situation at the time of accessing the memory device 42, by using an error score 11b. On the other hand, the control apparatus 30 manages an error occurrence situation at the time of accessing the memory device 42, by using an error score 31a. The error scores 11b and 31a are used to determine whether the memory device 42 malfunctions. Hence, one of the control apparatuses 10 and 30 needs to add up the error scores 11b and 31a, in order to determine such malfunction on the basis of the result of addition.

In the present embodiment, the control apparatus 20 adds up error scores to determine a malfunction of the memory device 41. Also, the control apparatus 30 adds up error scores to determine a malfunction of the memory device 42. As described above, a control apparatus close to a corresponding memory device executes management processes, such as addition of error scores and determination of malfunction, so as not to concentrate the burden of management processes on one control apparatus, thereby reducing the processing load of each control apparatus.

Next, configurations of the control apparatuses 10, 20, and 30 will be described. The control apparatus 10 includes a memory unit 11 and a control unit 12. For example, the memory unit 11 is a memory device, such as a random access memory (RAM) and an HDD. For example, the control unit 12 is a processor. In this case, a process of the control unit 12 is executed in accordance with a predetermined program.

The memory unit 11 stores the aforementioned error scores 11a and 11b. The control unit 12 changes the value of the error score 11a in the memory unit 11 on the basis of an error detected when accessing the memory device 41 through the control apparatus 20. For example, the control unit 12 adds a score according to a detected error to the error score 11a. Also, the control unit 12 changes the value of the error score 11b in the memory unit 11 on the basis of an error detected when accessing the memory device 42 through the control apparatus 30.

Also, the control unit 12 transmits the error score 11a in the memory unit 11 to the control apparatus at predetermined times. Also, the control unit 12 transmits the error score 11b in the memory unit 11 to the control apparatus 30 at predetermined times. Note that the control unit 12 may transmit the error score 11a each time the error score 11a is updated, and may transmit the error score 11a at certain time intervals, and may transmit the error score 11a each time the error score 11a increases or decreases by a certain amount, and may transmit the error score 11a when the error score 11a has exceeded a predetermined threshold value, for example. The error score 11b is transmitted at the same transmission times.

The control apparatus 20 includes a memory unit 21 and a control unit 22. For example, the memory unit 21 is a memory device, such as a RAM and an HDD. For example, the control unit 22 is a processor. In this case, a process of the control unit 22 is executed in accordance with a predetermined program.

The memory unit 21 stores the aforementioned error score 21a. The control unit 22 changes the value of the error score 21a in the memory unit 21 on the basis of an error detected when accessing the memory device 41. For example, the control unit 22 adds a score according to a detected error to the error score 21a. Also, the control unit 22 determines whether the memory device 41 malfunctions on the basis of a sum obtained by adding up the error score 11a received from the control apparatus 10 and the error score 21a in the memory unit 21.

The control apparatus 30 includes a memory unit 31 and a control unit 32. For example, the memory unit 31 is a memory device, such as a RAM and an HDD. For example, the control unit 32 is a processor. In this case, a process of the control unit 32 is executed in accordance with a predetermined program.

The memory unit 31 stores the aforementioned error score 31a. The control unit 32 changes the value of the error score 31a in the memory unit 31 on the basis of an error detected when accessing the memory device 42. For example, the control unit 32 adds a score according to a detected error to the error score 31*a*. Also, the control unit 32 determines whether the memory device 42 malfunctions on the basis of a sum obtained by adding up the error score 11*b* received from the control apparatus 10 and the error score 31*a* in the memory unit 31.

With the above configuration, the processing loads of error score addition and malfunction determination are less likely to be concentrated on one control apparatus, so as to reduce the processing load of each control apparatus.

Second Embodiment

Figure 2:
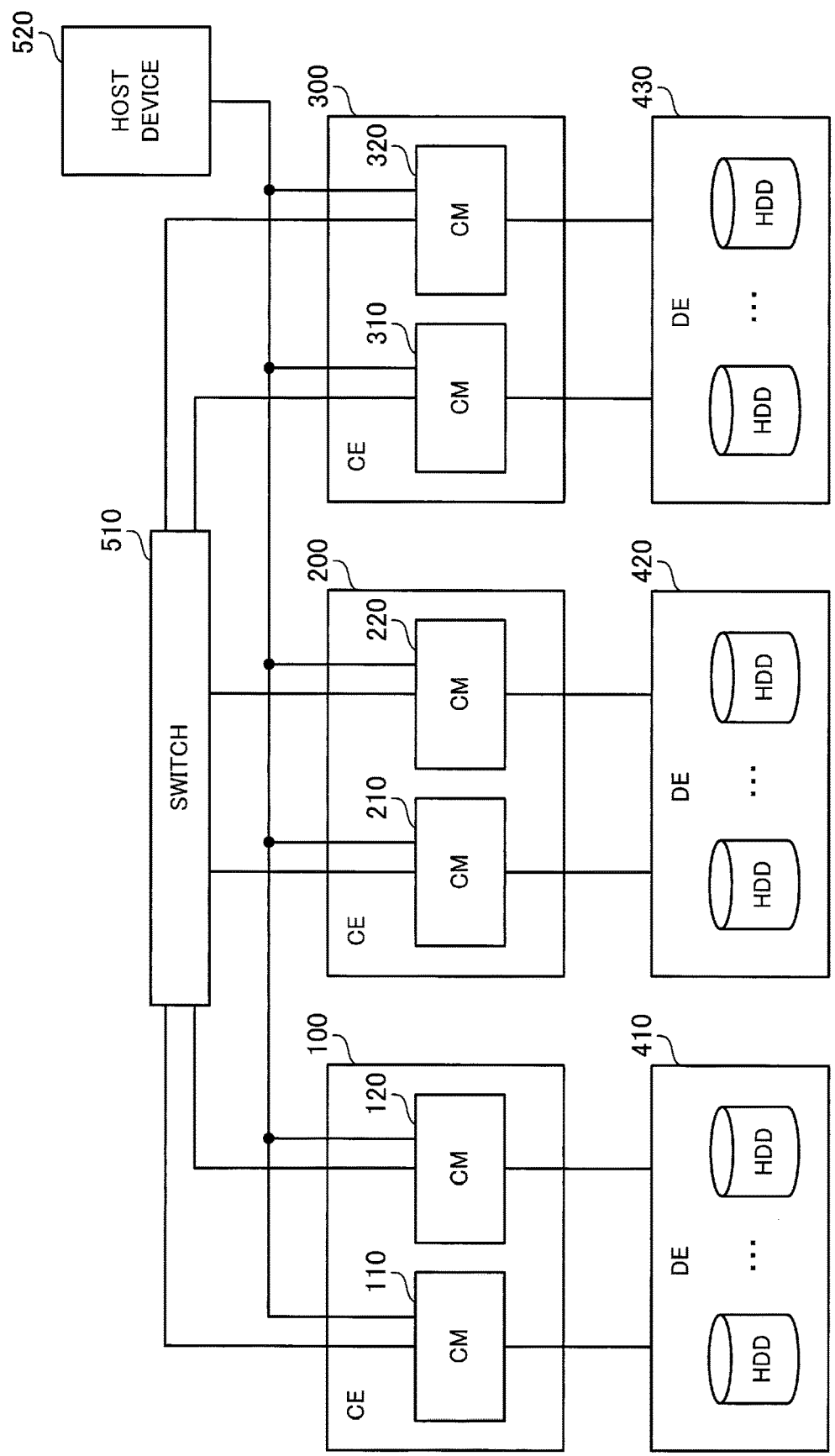
FIG. 2 illustrates an exemplary configuration of a storage system according to a second embodiment.

FIG. 2 illustrates an exemplary configuration of a storage system according to the second embodiment. The storage system illustrated in FIG. 2 includes controller enclosures (CE) 100, 200, and 300, device enclosures (DE) 410, 420, and 430, a switch 510, and a host device 520.

The controller enclosure 100 includes controller modules (CM) 110 and 120. The controller enclosure 200 includes controller modules 210 and 220. The controller enclosure 300 includes controller modules 310 and 320. The controller modules 110, 120, 210, 220, 310, and 320 are connected to each other via the switch 510. The controller modules 110, 120, 210, 220, 310, and 320 are connected to the switch 510 through a peripheral component interconnect (PCI) express bus, for example.

Also, the host device 520 is connected to the controller modules 110, 120, 210, 220, 310, and 320. The controller modules 110, 120, 210, 220, 310, and 320 are connected to the host device 520 via a storage area network (SAN) using a fiber channel (FC), an internet small computer system interface (iSCSI), or the like, for example. Although one host device 520 is connected to the controller modules 110, 120, 210, 220, 310, and 320 in the example of FIG. 2, a plurality of host devices may be connected to one or more controller modules, for example.

Each of the device enclosures 410, 420, and 430 includes a plurality of memory devices. In the present embodiment, the device enclosures 410, 420, and 430 are disk array devices including HDDs as memory devices. Note that the memory devices in the device enclosures 410, 420, and 430 may be of another type, such as a solid state drive (SSD).

The device enclosure 410 is connected to the controller modules 110 and 120. The controller modules 110 and 120 control access to the HDDs in the device enclosure 410 in response to a request from the host device 520 or another controller module. The device enclosure 420 is connected to the controller modules 210 and 220. The controller modules 210 and 220 control access to the HDDs in the device enclosure 420 in response to a request from the host device 520 or another controller module. The device enclosure 430 is connected to the controller modules 310 and 320. The controller modules 310 and 320 control access to the HDDs in the device enclosure 430 in response to a request from the host device 520 or another controller module.

Note that the controller enclosure 100 and the device enclosure 410 are configured as a storage device contained in one housing, for example. The controller enclosure 200 and the device enclosure 420, as well as the controller enclosure 300 and the device enclosure 430, are configured in the same way. The storage system of FIG. 2 has a scale-out configuration of this storage device.

Also, the number of controller enclosures included in the storage system is not limited to three, and the number of controller modules included in each controller enclosure is not limited to two. For example, the storage system may include twelve device enclosures each including two controller modules. Note that each controller enclosure is connected to an individual device enclosure, regardless of the number of controller enclosures and the number of controller modules in a controller enclosure.

Also, the controller modules 110, 120, 210, 220, 310, and 320 may be connected to a management terminal that allows an administrator to perform setting and maintenance for the controller modules 110, 120, 210, 220, 310, and 320.

Figure 3:
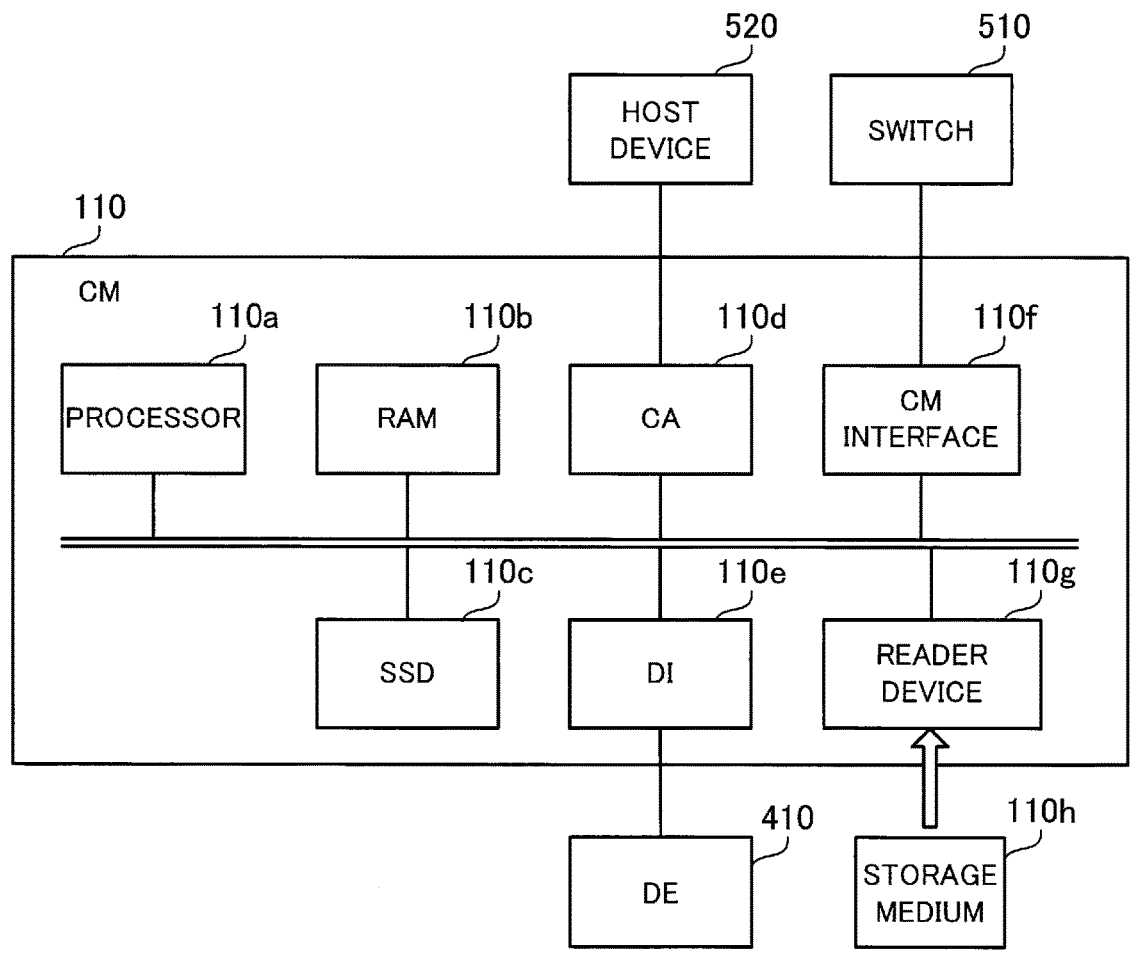
FIG. 3 illustrates an exemplary hardware configuration of a controller module.

FIG. 3 illustrates an exemplary hardware configuration of a controller module. The controller modules 110, 120, 210, 220, 310, and 320 have the same hardware configuration, and thus here the hardware configuration of the controller module 110 will be described representatively.

The entire device of the controller module 110 is controlled by a processor 110*a*. The processor 110*a* may be a multiprocessor. For example, the processor 110*a* is a central processing unit (CPU), a micro processing unit (MPU), a digital signal processor (DSP), an application specific integrated circuit (ASIC), or a programmable logic device (PLD). Also, the processor 110*a* may be a combination of two or more of a CPU, an MPU, a DSP, an ASIC, and a PLD.

A RAM 110*b* and a plurality of peripheral devices are connected to the processor 110*a* via a bus. The RAM 110*b* is used as a main memory device of the controller module 110. At least a part of an operating system (OS) program and an application program executed in the processor 110*a* is temporarily stored in the RAM 110*b*. Also, various types of data used in processing of the processor 110*a* are stored in the RAM 110*b*.

Peripheral devices connected to the bus are an SSD 110*c*, a channel adapter (CA) 110*d*, a drive interface (DI) 110*e*, a controller module interface 110*f*, and a reader device 110*g*.

The SSD 110*c* is used as an auxiliary memory device of the controller module 110. An OS program, an application program, and various types of data are stored in the SSD 110*c*. Note that a non-volatile memory device of another type, such as an HDD, may be used as an auxiliary memory device.

The channel adapter 110*d* is an interface for communicating with the host device 520. The drive interface 110*e* is an interface for communicating with the device enclosure 410. The controller module interface 110*f* is an interface for communicating with other controller modules 120, 210, 220, 310, and 320 via the switch 510. Note that the drive interface 110*e* is a serial attached SCSI (SAS) interface for example, and has a function for transmitting an SCSI command to the HDDs in the device enclosure 410 in response to an instruction from the processor 110*a*.

A portable storage medium 110*h* is detachably mounted in the reader device 110*g*. The reader device 110*g* reads data stored in the storage medium 110*h* and transmits the read data to the processor 110*a*. The storage medium 110*h* is, for example, an optical disc, a magneto-optical disk, and a semiconductor memory.

Figure 4:
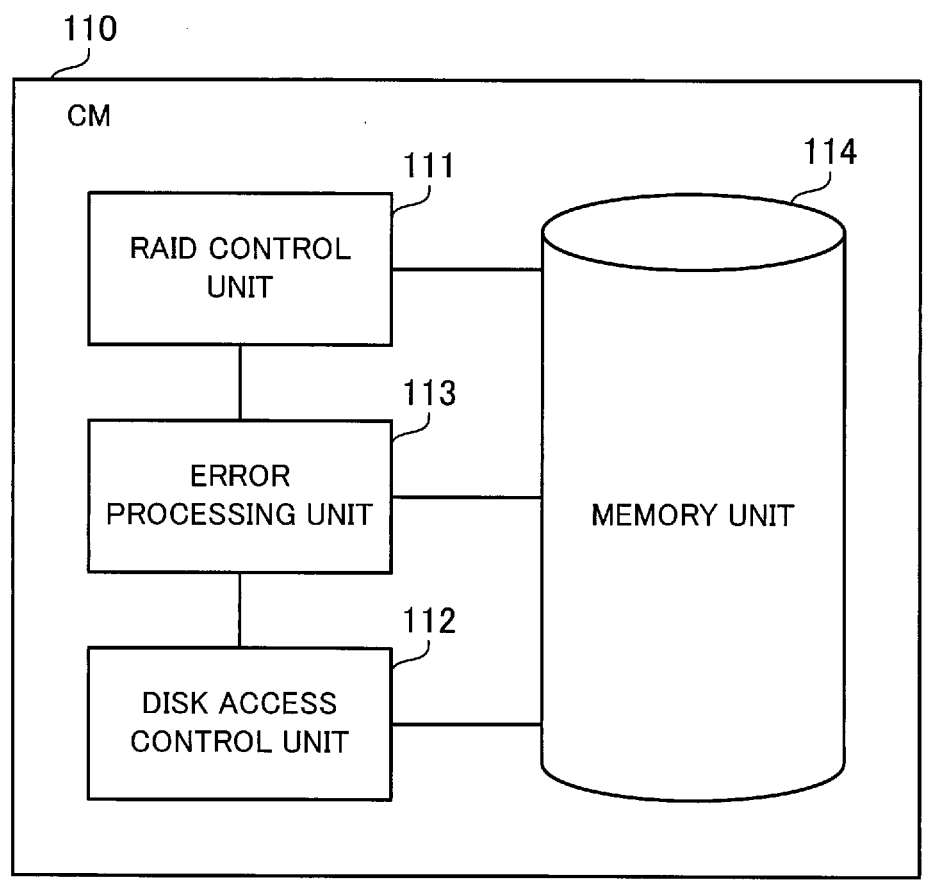
FIG. 4 is a block diagram illustrating an exemplary configuration of processing functions included in a controller module.

FIG. 4 is a block diagram illustrating an exemplary configuration of processing functions of a controller module. The controller modules 110, 120, 210, 220, 310, and 320 have the same processing functions, and thus here processing functions of the controller module 110 will be described representatively.

The controller module 110 includes a RAID control unit 111, a disk access control unit 112, an error processing unit 113, and a memory unit 114. Processing of the RAID control unit 111, the disk access control unit 112, and the error processing unit 113 is achieved by the processor 110*a* in the controller module 110 which executes a predetermined program, for example. For example, the memory unit 114 is implemented as a memory region in a memory device, such as the RAM 110b and the SSD 110c, of the controller module 110.

The RAID control unit 111 controls access to logical volumes set in a RAID group. The RAID group is a logical memory region provided by a plurality of HDDs, in which recorded data is controlled to be stored redundantly in two or more HDDs. One or more logical volumes are set in a RAID group, and a logical volume is a logical memory region which the host device 520 recognizes as one volume.

The RAID control unit 111 receives an access request to a logical volume from the host device 520. The RAID control unit 111 requests access to an HDD that provides a physical memory region of a logical volume to which access is requested from the host device 520. In doing so, the RAID control unit 111 controls access according to a RAID level.

For example, when receiving a data write request for writing data into a logical volume controlled by RAID-1, the RAID control unit 111 controls the write data in such a manner to duplicate the write data in two HDDs. Also, when receiving a data read request for reading data from a logical volume, the RAID control unit 111 controls the data in such a manner to read the data from one of the two HDDs.

Also, for example, when receiving a data write request for writing data into a logical volume controlled by RAID-5, the RAID control unit 111 divides write data into a predetermined number of pieces to calculate a parity based on the divided data, and controls the divided data and the parity in such a manner to record the divided data and the parity in a plurality of HDDs in a distributed manner. Also, when receiving a data read request for reading data from a logical volume, the RAID control unit 111 controls divided data in such a manner to read the divided data from a plurality of HDDs.

Here, the physical memory region of a logical volume for which the RAID control unit 111 accepts an access request may be an HDD in the device enclosure 410 connected to the controller module 110, and may be an HDD in the device enclosure 420 or 430 connected to another controller module. In the former case, the RAID control unit 111 requests the disk access control unit 112 in the controller module 110 access to an HDD in the device enclosure 410 which provides a physical memory region of a logical volume. On the other hand, in the latter case, the RAID control unit 111 requests access to an HDD, to a disk access control unit of another controller module connected to a device enclosure including an HDD that provides a physical memory region of a logical volume. Note that an access request to a disk access control unit of another controller module is transmitted via the switch 510.

The disk access control unit 112 accesses an HDD in the device enclosure 410 connected to the controller module 110 via the drive interface 110e, in response to an access request from the RAID control unit 111 in the controller module 110 or a RAID control unit in another controller module. For example, this access is executed by an SCSI command which is transmitted from the drive interface 110e to an HDD.

As described above, access controls of the controller module 110 are roughly classified into two types: "RAID control" by the RAID control unit 111 for controlling access to logical volumes and "disk access control" by the disk access control unit 112 for controlling access to a physical memory region of a logical volume. Then, functions of the RAID control and the disk access control for a certain logical volume are implemented in different controller modules. In other words, RAID control for a certain logical volume and disk access control for the same logical volume are executed by different controller modules. Note that this point will be described later with reference to FIG. 5.

The error processing unit 113 executes an error score addition process, upon detecting an error when the RAID control unit 111 requests access to an HDD in a device enclosure connected to another controller module or when the disk access control unit 112 requests access to an HDD in the device enclosure 410. In the memory unit 114, an error score is stored for each HDD that is accessed, and the error processing unit 113 adds points according to the type of a detected error to the error score corresponding to the HDD for which the error is detected.

Also, the error processing unit 113 controls disconnection of an HDD on the basis of a corresponding error score. Note that, in the case where different controller modules control a logical volume respectively for RAID control and disk access control, both the controller modules may independently detect an error in access to an HDD allocated to the logical volume. Therefore, the error processing unit 113 controls the controller module responsible for disk access control to add up error scores and to disconnect the HDD. The detail of the process by the error processing unit 113 will be described later.

The memory unit 114 stores various types of information used in processing of the RAID control unit 111, the disk access control unit 112, and the error processing unit 113. For example, the memory unit 114 stores error scores of HDDs, setting information indicating the configuration of a RAID group, information indicating controller modules responsible for RAID control and disk access control for HDDs, and information for determining disconnection of HDDs.

Figure 5:
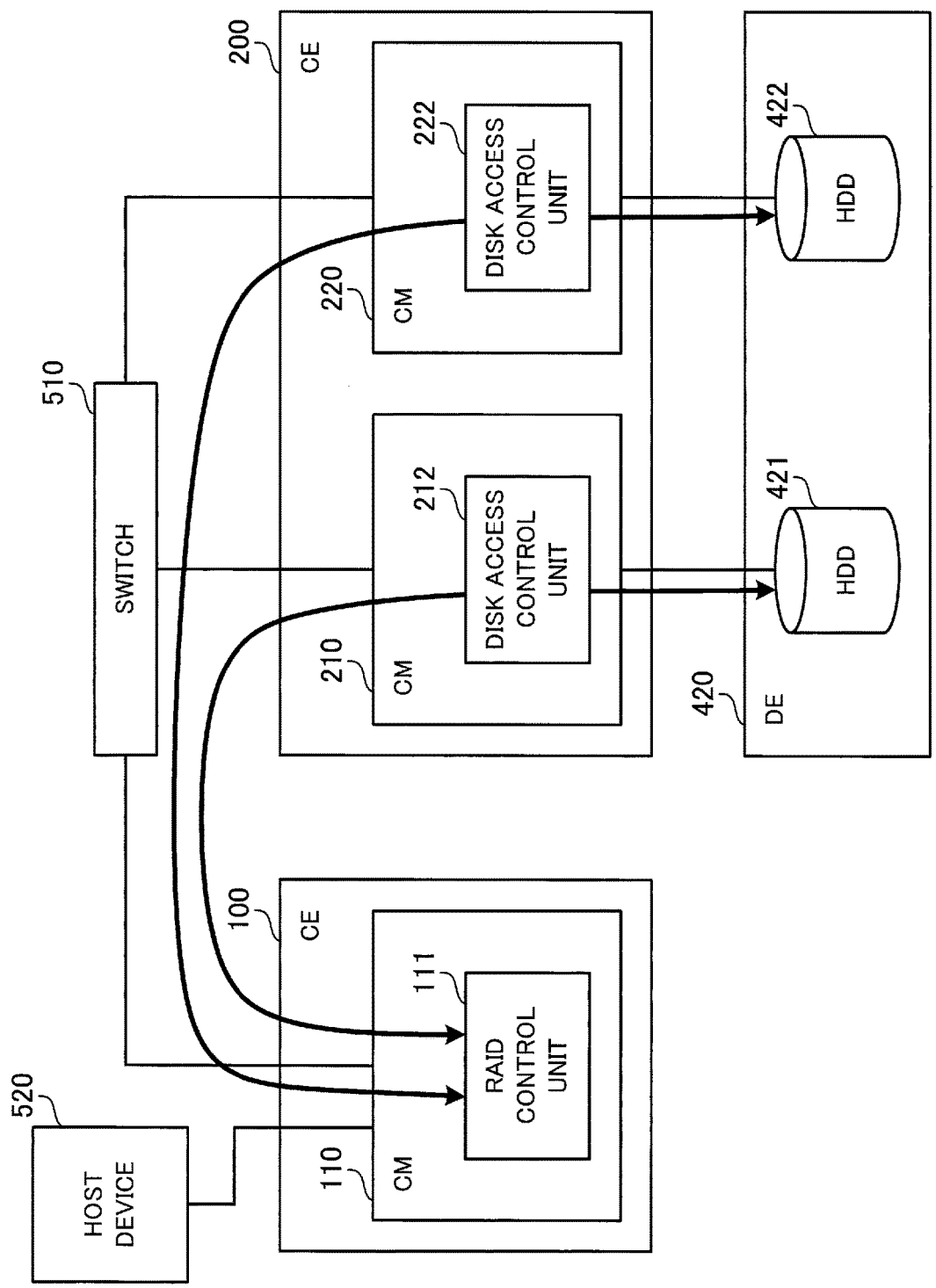
FIG. 5 illustrates an example in which RAID control and disk access control are performed by different controller modules.

Next, FIG. 5 illustrates an example in which RAID control and disk access control are performed by different controller modules. In the example of FIG. 5, HDDs 421 and 422 in the device enclosure 420 provide physical memory regions of logical volumes for which the controller module 110 is responsible for RAID control. These logical volumes are controlled by RAID-1. That is, the data that is requested to be written into the logical volumes by the host device 520 is duplicated in the HDDs 421 and 422.

Also, in the example of FIG. 5, the controller module 210 is responsible for disk access control for the HDD 421, and the controller module 220 is responsible for disk access control for the HDD 422. In the present embodiment, different controller modules are responsible for disk access control for the HDDs that provide physical memory regions of logical volumes, as in this example. Note that the controller module 210 includes a disk access control unit 212 that has a disk access control function for the HDD 421, and the controller module 220 includes a disk access control unit 222 that has a disk access control function for the HDD 422.

Upon receiving a write request into a logical volume from the host device 520, the RAID control unit 111 requests the disk access control unit 212 of the controller module 210 to write data into the HDD 421, and requests the disk access control unit 222 of the controller module 220 to write data into the HDD 422. The disk access control unit 212 writes data into the HDD 421 in response to the request from the RAID control unit 111. The disk access control unit 222 writes data into the HDD 422 in response to the request from the RAID control unit 111.

Also, upon receiving a read request of a logical volume from the host device 520, the RAID control unit 111 requests the disk access control unit 212 or the disk access control unit 222 to read data. For example, when a read request is transmitted to the disk access control unit 212, the disk access control unit 212 reads data from the HDD 421 and transmits the read data to the RAID control unit 111.

As in the above example of FIG. 5, RAID control and disk access control for a certain logical volume are performed by different controller modules, in order to increase the degree of freedom of the HDDs that are assigned to the logical volume, thereby utilizing the HDDs efficiently. Also, different controller modules perform disk access control for respective HDDs that provide physical memory regions of logical volumes, in order to decrease the possibility that data of the logical volumes becomes inaccessible when a malfunction occurs in the controller modules, thereby improving their fault tolerance.

In the meantime, in the example of FIG. 5, the RAID control unit 111 of the controller module 110 accesses the HDD 421 via the disk access control unit 212 of the controller module 210. In this configuration, it is possible that both of the RAID control unit 111 and the disk access control unit 212 detect an error when accessing the same HDD 421.

For example, the disk access control unit 212 can detect a data read error, a data write error, a spin-up failure of the HDD 421, a media error detected in periodic patrol to the HDD 421, or the like. For example, the HDD 421 side detects most of these errors in response to an SCSI command to the HDD 421, and reports the detected errors to the controller module 210. These errors are able to be detected by the controller module 210 that is directly connected to the device enclosure 420 including the HDD 421, but are unable to be detected by the RAID control unit 111 that does not directly transmit a command to the HDD.

On the other hand, the RAID control unit 111 can detect a data read error from the HDD 421. One of these data read errors is an error detected by data integrity check. The data integrity check is a process to check whether data can be read correctly, while maintaining its redundancy, from a plurality of HDDs that provide logical volumes. In the case of RAID-1, whether the same data has been read from two HDDs is checked. In the case of RAID-5, data and a parity included in a stripe are read from corresponding HDDs, and whether the read parity is identical with the parity calculated from the data is checked. An error found in this integrity check is not detected by a controller module responsible for disk access control, but can be detected only by a controller module responsible for RAID control.

As described above, in the present embodiment, a plurality of controller modules can detect errors that occur in access to one HDD. Each of these controller modules retains an error score that is accumulated on the basis of errors detected by the controller module. Hence, in order to control disconnection of HDDs by using the error scores, one of these controller modules needs to add up the error scores retained by these controller modules.

Here, there are next two problems in adding up error scores by one controller module.
(Problem 1) Error scores are transferred between controller modules, and thus the traffic of the transmission channel between the controller modules increases.
(Problem 2) The processing load of the controller module that adds up error scores increases, which might impair access performance of the controller module in response to a request from the host device 520, depending on circumstances.

Figure 6:
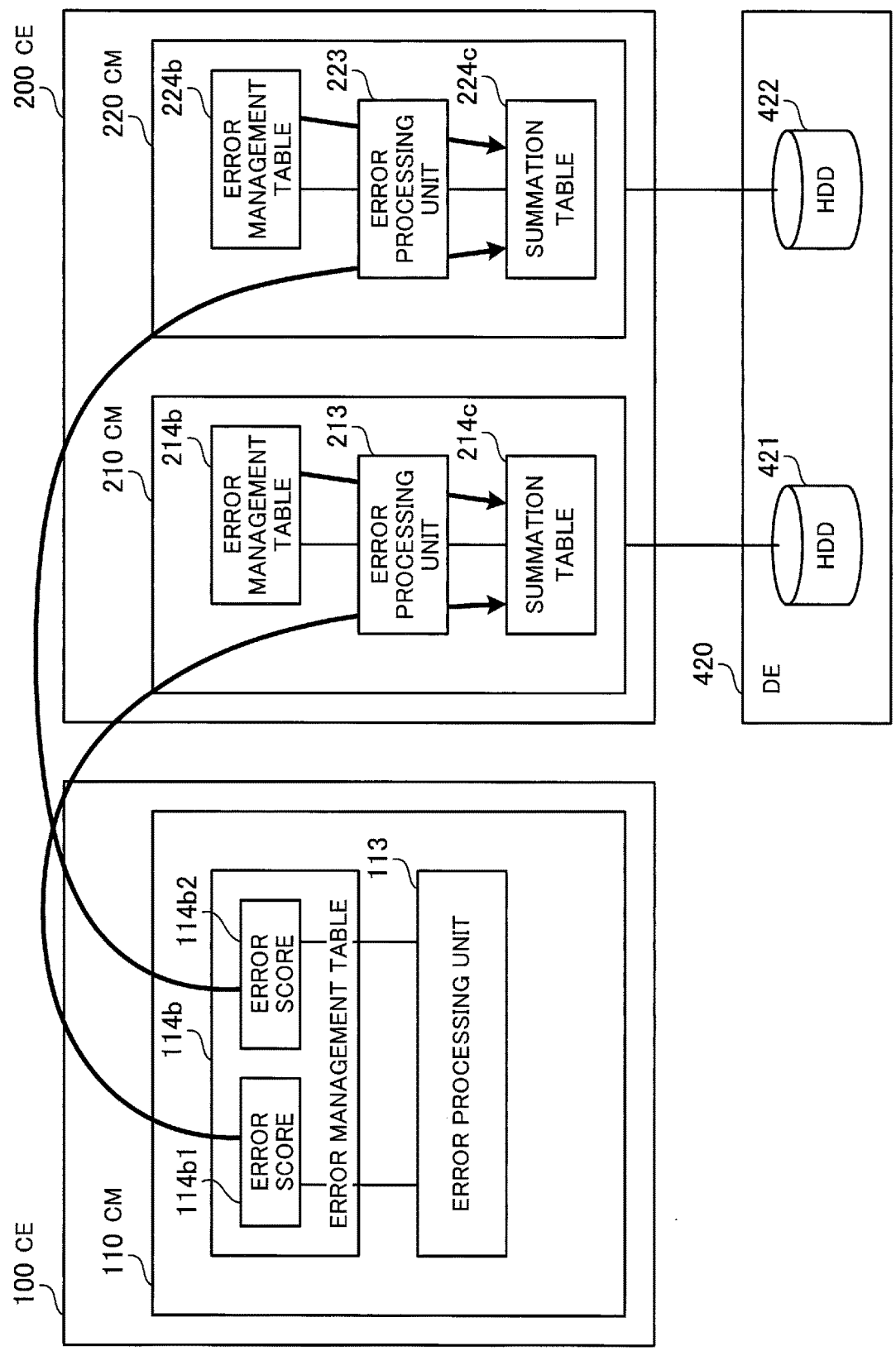
FIG. 6 illustrates exemplary arrangement of controller modules responsible for summation of error scores.

Against these problems, error scores are added up as illustrated in next FIG. 6, in the present embodiment. FIG. 6 illustrates exemplary arrangement of controller modules responsible for summation of error scores. This FIG. 6 illustrates how to add up error scores, when the RAID control responsible controller module and the disk access control responsible controller modules are arranged as in FIG. 5 with respect to the HDDs 421 and 422.

An error management table 114*b* for recording error scores is stored in the memory unit 114 of the controller module 110. In this error management table 114*b*, an error score 114*b*1 for the HDD 421 and an error score 114*b*2 for the HDD 422 are stored. Also, in the memory unit of the controller module 210, an error management table 214*b* for recording an error score for the HDD 421 is stored. Further, in the memory unit of the controller module 220, an error management table 224*b* for storing an error score for the HDD 422 is stored.

If an error is detected when the RAID control unit 111 of the controller module 110 accesses the HDD 421, the error processing unit 113 of the controller module 110 adds a score according to the type of the error to the error score 114*b*1 in the error management table 114*b*. Also, if an error is detected when the RAID control unit 111 of the controller module 110 accesses the HDD 422, the error processing unit 113 of the controller module 110 adds a score according to the type of the error to the error score 114*b*2 in the error management table 114*b*.

The controller module 210 includes an error processing unit 213. If an error is detected when the disk access control unit 212 of the controller module 210 accesses the HDD 421, the error processing unit 213 adds a score according to the type of the error to the error score in the error management table 214*b*.

The controller module 220 includes an error processing unit 223. If an error is detected when the disk access control unit 222 of the controller module 220 accesses the HDD 422, the error processing unit 223 adds a score according to the type of the error to the error score in the error management table 224*b*.

In this way, the error scores for the HDD 421 are stored in a distributed manner in the error management table 114*b* and the error management table 214*b*. Also, the error scores for the HDD 422 are stored in a distributed manner in the error management table 114*b* and the error management table 224*b*. Thus, one controller module needs to add up the error scores of each HDD.

In the present embodiment, error scores for a certain HDD are added up in a disk access control responsible controller module, which is selected from among a RAID control responsible controller module and a disk access control responsible controller module corresponding to the HDD, and the disk access control responsible controller module controls disconnection of the HDD on the basis of the result of the addition. This reduces the transfer frequency of error scores between controller modules, so as to prevent increase of traffic of the transmission channel between the controller modules. That is, the above problem 1 is mitigated.

Such an effect is obtained, because the error detection frequency of the RAID control responsible controller module is lower than that of the disk access control responsible controller module. As described above, a disk access control responsible controller module directly transmits commands to an HDD, and thus be able to detect many types of errors reported in response to the commands. In contrast, errors that can be detected by a RAID control responsible controller module are limited to a smaller number of types of errors, such as the aforementioned data read error, as compared with a disk access control responsible controller module.

Thus, a RAID control responsible controller module of a low error detection frequency transfers its error score to a disk access control responsible controller module, in order to reduce the transfer frequency of error scores between the controller modules.

In the example of FIG. 6, the controller module 210 adds up the error scores for the HDD 421, and the controller module 220 adds up the error scores for the HDD 422. Specifically, a summation table 214c is stored in the memory unit of the controller module 210. The error processing unit 113 of the controller module 110 transmits the error score 114b1 stored in the error management table 114b to the controller module 210. The error processing unit 213 of the controller module 210 adds up the error score 114b1 transmitted from the controller module 110 and the error score stored in the error management table 214b, and records the sum in the summation table 214c. When the sum has exceeded a predetermined threshold value, the error processing unit 213 determines that the HDD 421 malfunctions and disconnects the HDD 421. As described above, the controller module 210 adds up the error scores, in order to reduce the transfer frequency of error scores between the controller module 110 and the controller module 210, as compared with a case in which the controller module 110 adds up the error scores.

Also, a summation table 224c is stored in the memory unit of the controller module 220. The error processing unit 113 of the controller module 110 transmits the error score 114b2 stored in the error management table 114b to the controller module 220. The error processing unit 223 of the controller module 220 adds up the error score 114b2 transmitted from the controller module 110 and the error score stored in the error management table 224b, and records the sum in the summation table 224c. When the sum has exceeded a predetermined threshold value, the error processing unit 223 determines that the HDD 422 malfunctions and disconnects the HDD 422. As described above, the controller module 220 adds up the error scores, in order to reduce the transfer frequency of error scores between the controller module 110 and the controller module 220, as compared with a case in which the controller module 110 adds up the error scores.

Here, in the configuration of FIG. 6, the controller module 110 accesses the two HDDs 421 and 422. Hence, one can conceive of a method in which the controller module 110 adds up the error scores for the HDDs 421 and 422. However, in this case, the controller module 110 adds up the error scores and controls disconnection for a plurality of HDDs, and thus the processing load of the controller module 110 increases.

In contrast, when a disk access control responsible controller module adds up error scores as described above, addition of the error scores is assigned to a plurality of controller modules in a distributed manner. As a result, the processing load of addition of error scores and disconnection control is distributed between the controller modules in the system, so as to reduce the processing load of each controller module. That is, a disk access control responsible controller module adds up error scores, in order to mitigate the above problem 2.

Next, a scheme for further reducing the transfer frequency of error scores will be described. Here, as an example, transmission of error scores of the HDD 421 will be described. The error processing unit 113 of the RAID control responsible controller module 110 compares the error score 114b1 stored in the error management table 114b with a predetermined transfer threshold value. When the stored error score 114b1 has exceeded the transfer threshold value, the error processing unit 113 transmits the error score 114b1 to the disk access control responsible controller module 210.

As described above, the error score is intermittently transmitted by using the transfer threshold value, in order to reduce the traffic of the transmission channel between the controller modules. Also, when the stored error score is equal to or smaller than the transfer threshold value, the possibility of malfunction in the corresponding HDD is low, and therefore it is unnecessary to transfer the error score for the purpose of addition in many cases. Thus, by comparing the error score and the transfer threshold value, the transfer frequency is reduced, while keeping the accuracy of HDD state monitoring.

Further, the transfer threshold value compared with an error score is variable, depending on an instruction from a summation responsible controller module. Specifically, a lower transfer threshold value is set, as a larger number of controller modules detect errors with respect to the corresponding HDD. Thereby, as a larger number of controller modules detect errors, the transfer frequency of error scores increases. According to this method, as the possibility of malfunction in an HDD increases, its error score is transferred more frequently, so that the summation responsible controller module can determine whether the HDD malfunctions on the basis of an accurate sum. Thus, the accuracy of HDD state monitoring and the reduction of transmission channel traffic are well balanced during operation.

Next, various types of information utilized in processing of a controller module will be described. Following FIGS. 7 to 9 illustrate table information stored in the memory unit 114 of the controller module 110 as an example.

First, FIG. 7 illustrates an exemplary configuration of a RAID management table. The RAID management table 114a includes fields of RAID group, member disk, status, RAID control responsible controller module, disk access control responsible controller module, and summation responsible controller module.

In the field of RAID group, numbers for identifying RAID groups set in the storage system are recorded. In the field of member disk, numbers for identifying HDDs assigned to the RAID groups as physical memory regions are recorded. In the field of status, statuses indicating whether or not the member disks operate normally are recorded. For example, when a member disk operates normally, "true" is recorded in the field of status. Also, when the member disk does not operate normally and is disconnected from its RAID group, "false" is recorded in the field of status.

In the field of RAID control responsible controller module, numbers for identifying controller modules responsible for RAID control of the member disks are recorded. In the field of disk access control responsible controller module, numbers for identifying controller modules responsible for disk access control of the member disks are recorded. In the field of summation responsible controller module, numbers for identifying controller modules responsible for summation of error scores of the member disks are recorded.

In the memory units of other controller modules 120, 210, 220, 310, and 320, RAID management tables having the same fields as FIG. 7 are stored. All RAID management tables of the controller modules 110, 120, 210, 220, 310, and 320 are synchronized. That is, when data of a RAID management table is updated in a certain controller module, the updated data is reported to all of other controller modules, and the updated data is reflected in the RAID management tables of all of other controller modules.

FIG. 8 illustrates an exemplary configuration of an error management table. The error management table 114b includes fields of disk number, error score, transfer threshold value, and error detection controller module.

In the field of disk number, numbers for identifying HDDs are recorded. The HDDs recorded in the field of disk number are accessible from the controller module 110. More specifically, these HDDs include HDDs for which the controller module 110 is responsible for RAID control, and HDDs for which the controller module 110 is responsible for disk access control.

In the field of error score, sums of error scores added on the basis of types of errors detected when accessing corresponding HDDs are recorded. The initial value of an error score is 0. In the field of transfer threshold value, threshold values for determining whether or not to transfer error scores are recorded. The initial value of a transfer threshold value is 0. Note that a transfer threshold value is not used for an HDD for which the controller module 110 is responsible for summation, and thus "NULL" is recorded in the field of transfer threshold value, for example.

In the field of error detection controller module, numbers for identifying controller modules that have detected errors in the corresponding HDDs at least once (i.e., that have added error scores at least once) are recorded. Controller modules that can be recorded in the field of error detection controller module include a controller module responsible for RAID control of a corresponding HDD, and a controller module responsible for disk access control of the corresponding HDD. Note that, as described later, data of the field of error detection controller module is synchronized between the RAID control responsible controller module and the disk access control responsible controller module with respect to the corresponding HDD.

FIG. 9 illustrates an exemplary configuration of a summation table. The summation table 114c includes fields of disk number, cumulative error score, and disconnection threshold value.

In the field of disk number, numbers for identifying HDDs are recorded. With regard to HDDs recorded in the field of disk number, the controller module 110 is responsible for summation of error scores. In the field of cumulative error score, cumulative values of error scores are recorded with respect to the corresponding HDDs. In the field of disconnection threshold value, threshold values that are compared with cumulative error scores to determine whether the corresponding HDDs malfunction are recorded. A predetermined value is set in the field of disconnection threshold value. Note that different disconnection threshold values may be set for HDDs, depending on specifications and manufacturing periods of HDDs, for example.

Next, processing of a controller module will be described by with reference to flowcharts.

Figure 10:
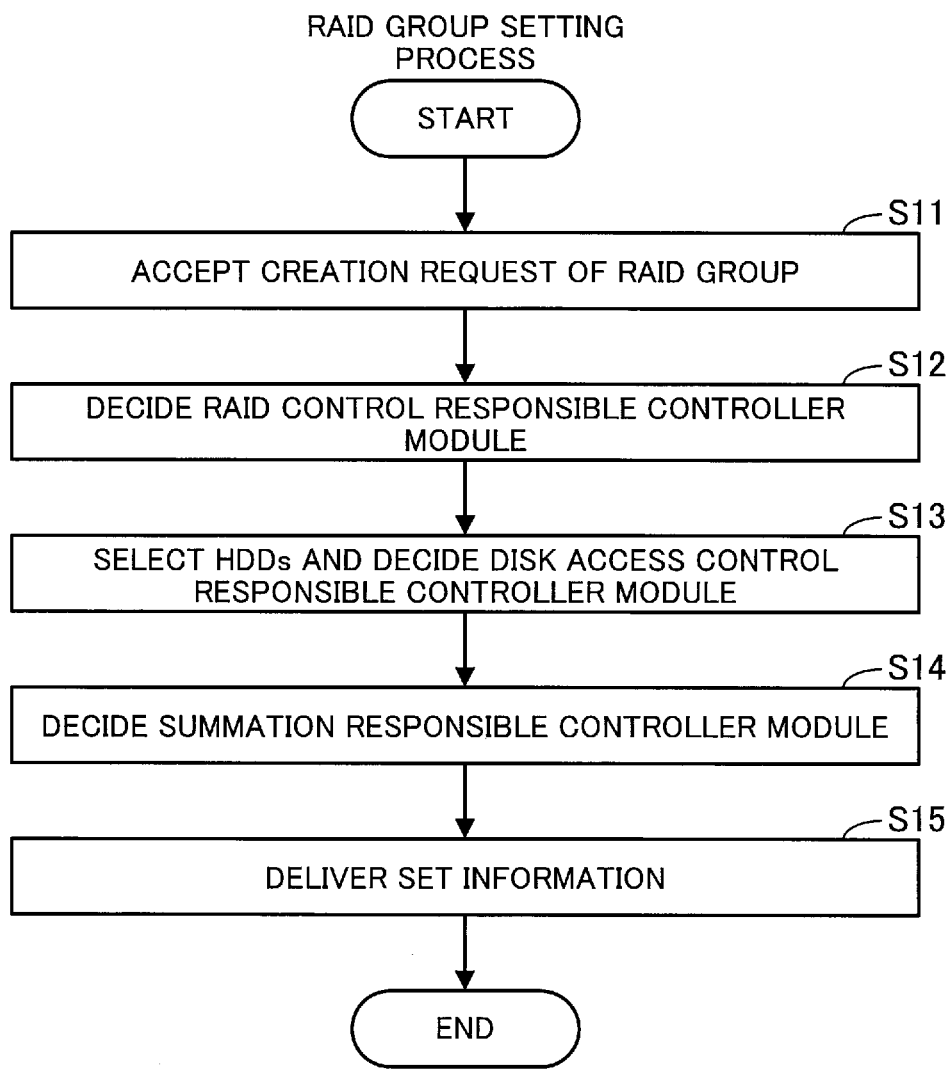
FIG. 10 is a flowchart illustrating an exemplary process for setting a RAID group.

First, FIG. 10 is a flowchart illustrating an exemplary process of setting a RAID group. The process illustrated in FIG. 10 may be executed in any of the controller modules 110, 120, 210, 220, 310, and 320. Here, for example, the process executed in the controller module 110 will be described. Although, in the following description, the process is executed in response to input operation at the host device 520, the process may be executed in response to input operation at a management terminal specialized for management of the controller modules 110, 120, 210, 220, 310, and 320, which is different from the host device 520, for example.

[Step S11] The RAID control unit 111 accepts a creation request of a new RAID group from the host device 520. This creation request is transmitted in response to input operation of a user into the host device 520.

[Step S12] The RAID control unit 111 decides a RAID control responsible controller module with respect to the new RAID group. For example, the RAID control unit 111 selects a controller module that is responsible for RAID control of a small number of HDDs and is assumed to have a low processing load, as a RAID control responsible controller module, from among all controller modules. Also, a RAID control responsible controller module may be selected by input operation at the host device 520, for example.

[Step S13] The RAID control unit 111 selects HDDs that provides physical memory regions of the new RAID group, from among HDDs that are not assigned to RAID groups in the device enclosures 410, 420, and 430. For example, the RAID control unit 111 accepts designation of the number of HDDs that provide physical memory regions of the new RAID group from the host device 520, and selects HDDs of the designated number.

Also, the RAID control unit 111 decides a disk access control responsible controller module with respect to each selected HDD. In the present embodiment, two controller modules are connected to a device enclosure including a selected HDD, and one of these two controller modules is decided as the disk access control responsible controller module. In this case, the RAID control unit 111 selects disk access control responsible controller modules in a distributed manner, for example.

The RAID control unit 111 creates records of the number of selected HDDs, in the RAID management table 114a. The RAID control unit 111 records a common identification number indicating the new RAID group, in the field of RAID group of each created record. Also, the RAID control unit 111 records the identification number of the controller module decided as the RAID control responsible controller module in step S12, in the field of RAID control responsible controller module of each record.

Further, the RAID control unit 111 records the identification number of a selected HDD in the field of member disks of each record, and sets "true" in the field of status of each record. Also, the RAID control unit 111 records the identification number of a controller module decided as a disk access control responsible controller module, in the field of disk access control responsible controller module of each record.

[Step S14] The RAID control unit 111 decides a controller module responsible for summation of error scores with respect to each HDD selected in step S13. The summation responsible controller module is basically same as the disk control responsible controller module. Hence, the RAID control unit 111 copies the identification number of the controller module recorded in the field of disk access control responsible controller module, to the field of summation responsible controller module, with respect to each record created in the RAID management table 114a in step S13.

[Step S15] The RAID control unit 111 delivers the information set in the RAID management table 114a by the above process to other controller modules 120, 210, 220, 310, and 320. Thereby, all data of the RAID management table of the controller modules 110, 120, 210, 220, 310, and 320 are synchronized. Each of the controller modules 110, 120, 210, 220, 310, and 320 can recognize the RAID group for which the controller module itself is responsible for RAID control, and the HDDs for which the controller module itself is responsible for disk access control and summation, on the basis of the RAID management table retained by the controller module itself.

Figure 11:
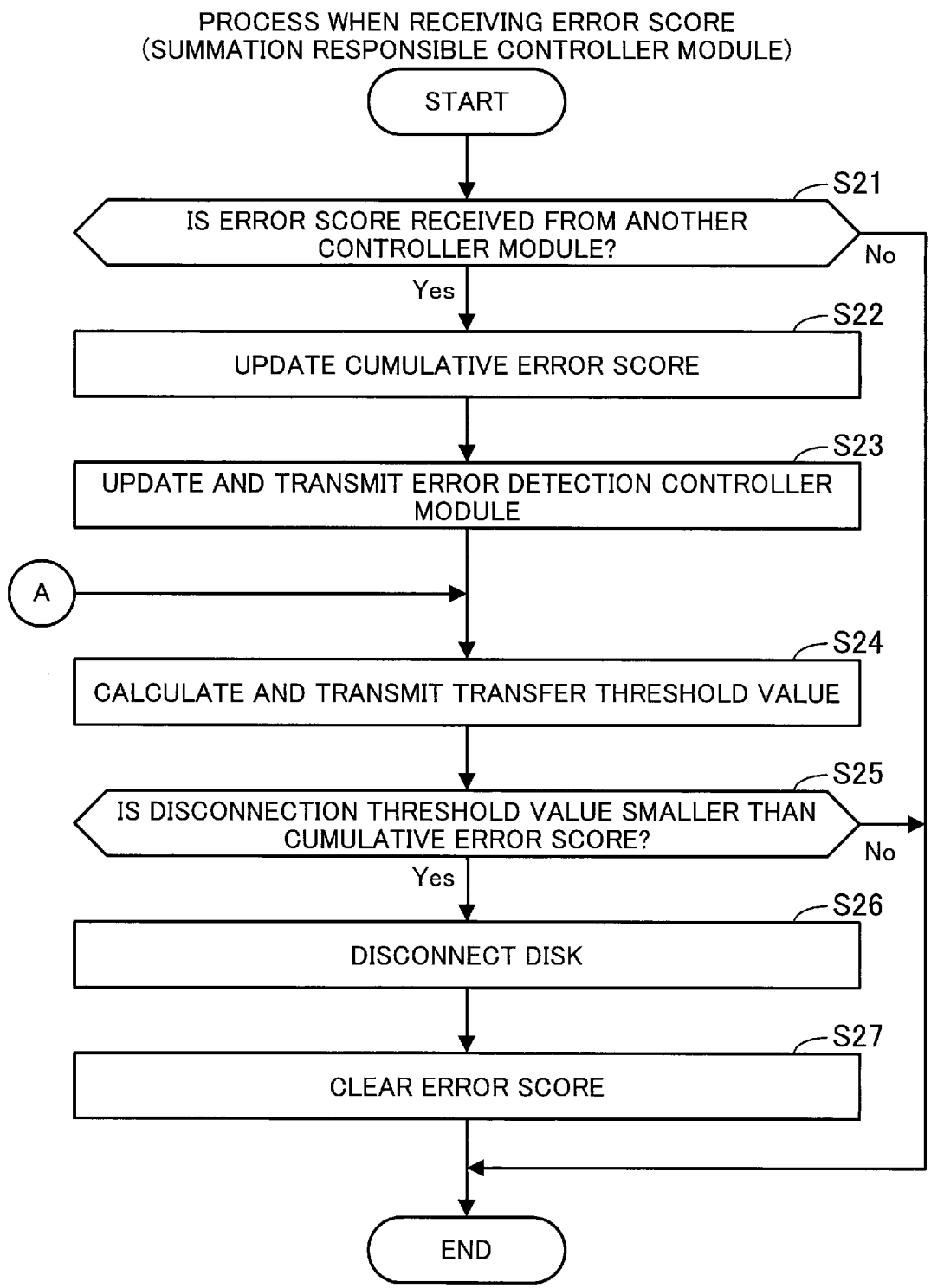
FIG. 11 is a flowchart illustrating an exemplary process of a summation responsible controller module upon receiving an error score.

FIG. 11 is a flowchart illustrating an exemplary process of a summation responsible controller module when receiving an error score. Here, as an example, a process executed when an error score is transmitted from another controller module with regard to an HDD (hereinafter, referred to as target HDD) for which the controller module 110 is responsible for summation of error scores will be described. For example, the process of FIG. 11 is executed at certain time intervals.

[Step S21] The error processing unit 113 determines whether an error score of the target HDD is received from another controller module that is responsible for RAID control of the target HDD. If an error score is received, the process proceeds to step S22. If an error score is not received, the process ends. Note that, for example, the identification number of the corresponding HDD is attached to the received error score, so that the error processing unit 113 can determine which HDD corresponds to the error score on the basis of the attached identification number.

[Step S22] The error processing unit 113 refers to the record of the target HDD in the summation table 114c. The error processing unit 113 adds the error score received in step S21 to the value recorded in the field of cumulative error score of the referred record, and updates the value recorded in the field with the value after the addition.

[Step S23] The error processing unit 113 refers to the record of the target HDD in the error management table 114b. If the identification number of the controller module that transmitted the error score in step S21 is not recorded in the field of error detection controller module of the referred record, the error processing unit 113 additionally records the identification number to the field. The error processing unit 113 transmits the updated data of the record to the controller module that transmitted the error score in step S21. Thereby, the record of the target HDD in the error management table 114b of the controller module 110 is synchronized with the record of the target HDD in the error management table of the controller module of delivery destination.

Note that the updated data of the record is needless to be transmitted in some cases. Note that the data of the record is transmitted and synchronized, in order to calculate a transfer threshold value by utilizing the data of the record in the transmission destination, even when the operation of the controller module 110 stops, for example.

[Step S24] The error processing unit 113 calculates a transfer threshold value for the target HDD by the next method. The error processing unit 113 reads the cumulative error score and the disconnection threshold value from the record of the target HDD in the summation table 114c. Here, P represents the read cumulative error score, and Th1 represents the read disconnection threshold value. Also, the error processing unit 113 determines how many controller modules are recorded in the field of error detection controller module, with reference to the record of the target HDD in the error management table 114b. This number of controller modules indicates how many controller modules have detected errors in the target HDD. Here, C represents this number of controller modules.

The error processing unit 113 calculates a transfer threshold value Th2 for the target HDD in accordance with the next conditions 1 and 2.

$Th2 = Th1/C$, when $P$ is smaller than $Th1/C$  (Condition 1)

$Th2 = 0$, when $P$ is equal to or larger than $Th1/C$  (Condition 2)

The error processing unit 113 transmits the calculated transfer threshold value Th2 to the controller module that transmitted the error score in step S21. Upon receiving the transmitted transfer threshold value Th2, the error processing unit of the controller module updates the transfer threshold value for the target HDD recorded in the error management table of the controller module, with the received transfer threshold value Th2.

In the above condition 1, the cumulative error score P is estimated to be smaller than the disconnection threshold value Th1 sufficiently. In this state, the number C of controller modules that have detected errors in the target HDD becomes larger, the transfer threshold value Th2 becomes smaller. Thus, as the number C of controller modules increases, the error score is transferred more frequently, so that the summation responsible controller module can determine whether to disconnect the target HDD on the basis of the accurate cumulative error score P. That is, the traffic of transmission channel is reduced in a balanced manner to maintain the accuracy of disconnection determination. Also, in the condition 2, the cumulative error score P is estimated to be close to the disconnection threshold value Th1. In this state, an error score is transferred each time an error is detected, in order to prioritize the accuracy of disconnection determination.

Note that, under the condition 2, the transfer threshold value Th2 may be calculated by an expression (Th1−P)/C, for example. In this case, in the condition 2, as the cumulative error score P becomes close to the disconnection threshold value Th1, the transfer threshold value Th2 becomes smaller, in order to further prioritize the accuracy of disconnection determination, as compared with the condition 1.

[Step S25] The error processing unit 113 determines whether the cumulative error score P has exceeded the disconnection threshold value Th1. If the cumulative error score P has exceeded the disconnection threshold value Th1, the process proceeds to step S26. If the cumulative error score P is equal to or smaller than the disconnection threshold value Th1, the process ends.

[Step S26] The error processing unit 113 determines that the target HDD malfunctions and disconnects this HDD. Specifically, the error processing unit 113 updates the status of the record of the target HDD in the RAID management table 114a to "false", and makes this HDD unusable.

[Step S27] The error processing unit 113 clears the error score of the record of the target HDD in the error management table 114b, and sets it at an initial value 0.

Figure 12:
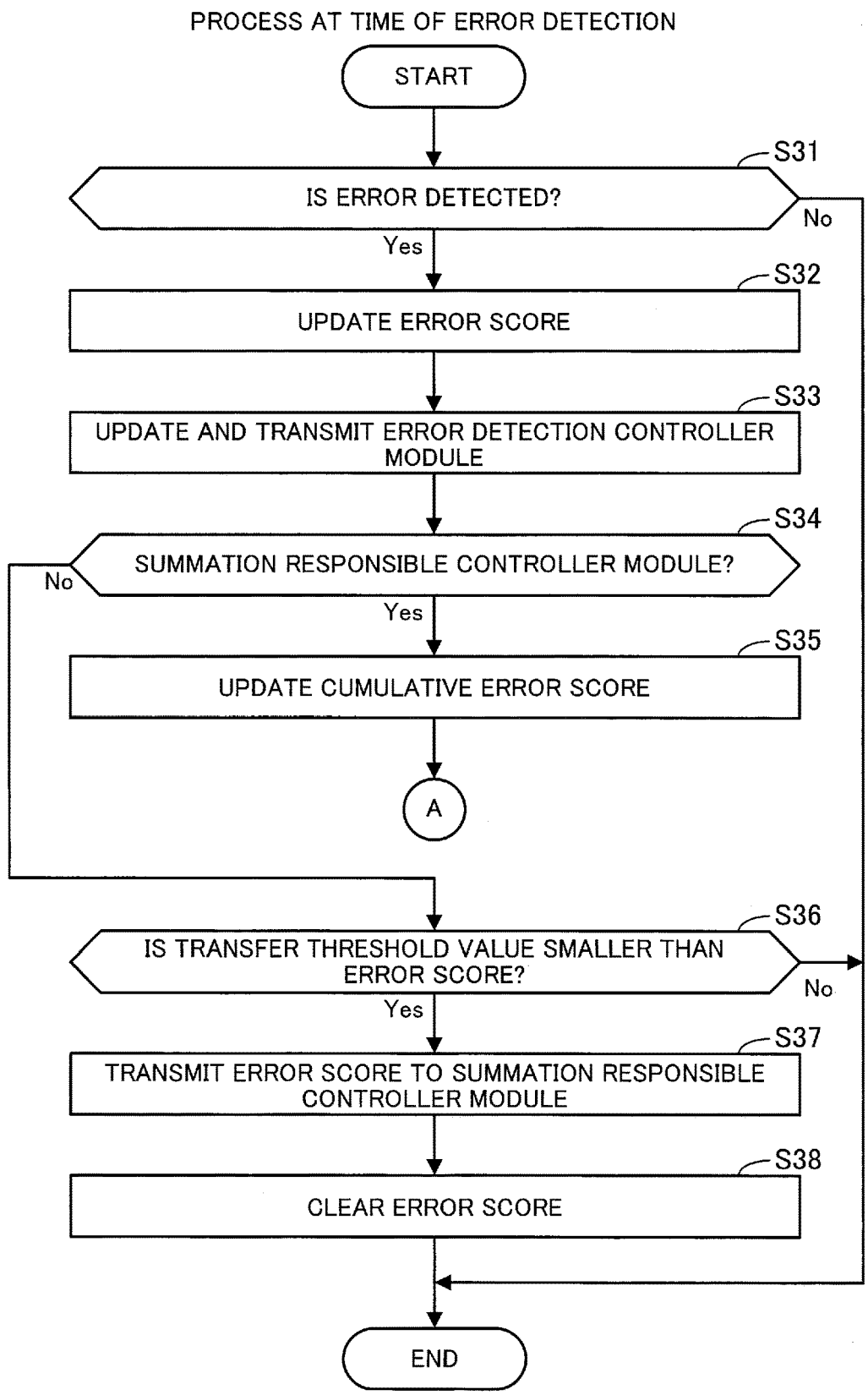
FIG. 12 is a flowchart illustrating an exemplary process at the time of error detection.

FIG. 12 is a flowchart illustrating an exemplary process at the time of error detection. The process of FIG. 12 is executed by both of the RAID control responsible controller module and the disk access control responsible controller module with respect to the target HDD. Here, the process in the controller module 110 will be described, as an example. For example, the process of FIG. 12 is executed at certain time intervals.

[Step S31] The error processing unit 113 determines whether an error of the target HDD is detected by either one of the RAID control unit 111 and the disk access control unit 112. If an error is detected, the process proceeds to step S32. If an error is not detected, the process ends.

[Step S32] The error processing unit 113 refers to the record of the target HDD in the error management table 114b. The error processing unit 113 adds a score according to the type of the error detected in step S31, to the value recorded in the field of error score of the referred record. The error processing unit 113 updates the recorded value of the field of error score of the referred record, with the value after the addition.

[Step S33] The error processing unit 113 refers to the record of the target HDD in the error management table 114b. When the identification number of the controller module 110 is not recorded in the field of error detection controller module of the referred record, the error processing unit 113 additionally records the identification number to the field.

The error processing unit 113 identifies a controller module (transmission destination controller module) to which the above updated data of the record of the error management table 114b is to be transmitted, from the field of RAID control responsible controller module or the access control responsible controller module, with reference to the record of the target HDD in the RAID management table 114a. The error processing unit 113 transmits the above updated data of the record of the error management table 114b to the identified transmission destination controller module. Thereby, the record of the target HDD in the error management table 114b of the controller module 110 is synchronized with the record of the target HDD in the error management table of the transmission destination controller module.

Note that, when the controller module 110 is responsible for disk access of the target HDD, the above updated data of the record is needless to be transmitted.

[Step S34] The error processing unit 113 determines whether the controller module 110 is a controller module responsible for summation of error scores, on the basis of the field of summation responsible controller module of the record of the target HDD in the RAID management table 114a. If the controller module 110 is a summation responsible controller module, the process proceeds to step S35. If the controller module 110 is not a summation responsible controller module, the process proceeds to step S36.

[Step S35] The error processing unit 113 refers to the record of the target HDD in the summation table 114c. The error processing unit 113 adds the error score updated in step S32 to the value recorded in the field of cumulative error score of the referred record, and updates the recorded value of the field with the value after the addition.

When step S35 ends, the process proceeds to step S24 of FIG. 11.

[Step S36] The error processing unit 113 compares the transfer threshold value and the error score recorded in the referred record, with reference to the record of the target HDD in the error management table 114b. If the error score is larger than the transfer threshold value, the process proceeds to step S37. If the error score is equal to or smaller than the transfer threshold value, the process ends.

[Step S37] The error processing unit 113 identifies the summation responsible controller module, with reference to the record of the target HDD in the RAID management table 114a. The error processing unit 113 transmits the error score recorded in the referred record in step S36, to the identified summation responsible controller module. Note that, in this process, the identification number of the target HDD is attached to the error score and transmitted, for example.

[Step S38] The error processing unit 113 clears the error score of the record of the target HDD in the error management table 114b, and sets it at an initial value 0.

Figure 13:
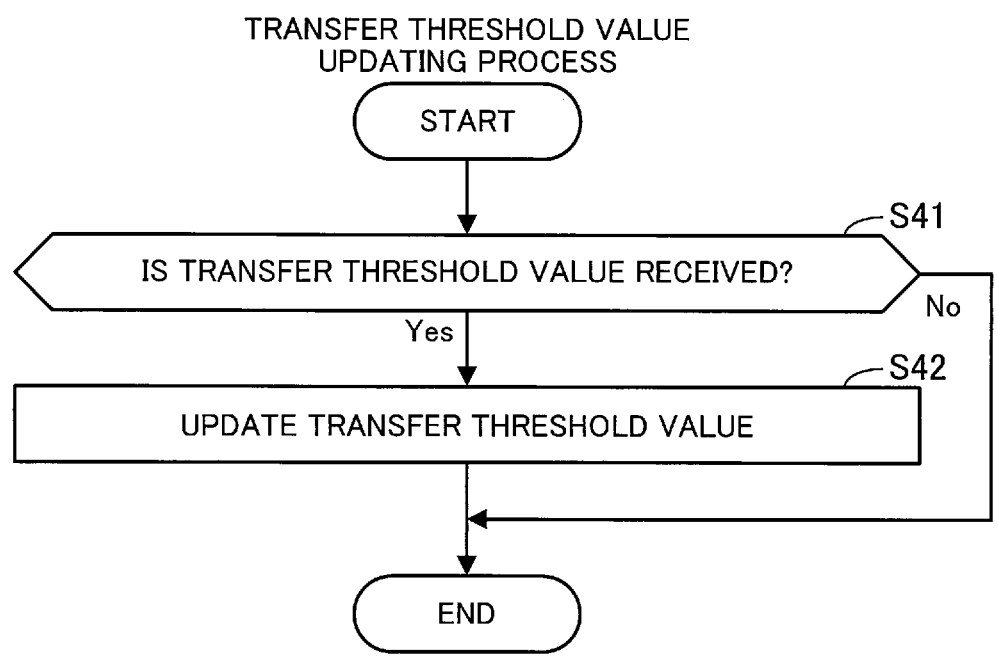
FIG. 13 is a flowchart illustrating an exemplary process for updating a transfer threshold value.

FIG. 13 is a flowchart illustrating an exemplary process of updating a transfer threshold value. This process of FIG. 13 is executed in the controller module responsible for RAID control of the target HDD. Here, as an example, the process of the controller module 110 will be described. For example, the process of FIG. 13 is executed at certain time intervals.

[Step S41] The error processing unit 113 determines whether the transfer threshold value for the target HDD is received from another controller module responsible for summation for the target HDD. If the transfer threshold value is received, the process proceeds to step S42. If the transfer threshold value is not received, the process ends. Note that, for example, the identification number of the corresponding HDD is attached to the received transfer threshold value, so that the error processing unit 113 can determine which HDD the transfer threshold value corresponds to on the basis of the attached identification number.

[Step S42] The error processing unit 113 refers to the record of the target HDD in the error management table 114b. The error processing unit 113 updates the transfer threshold value recorded in the referred record to the transfer threshold value received in step S41.

In the second embodiment described above, a plurality of controller modules can detect errors when accessing one HDD. In this configuration, the controller module responsible for disk access control of each HDD adds up error scores and controls disconnection, in order to reduce the traffic of the transmission channel between the controller modules. In addition, processing load is distributed between the controller modules in order to reduce the processing load of each controller module.

Also, a RAID control responsible controller module transmits an error score when the error score exceeds a transfer threshold value, in order to decrease the frequency of error scores, thereby reducing the traffic of the transmission channel between controller modules. Further, a transfer threshold value varies depending on the number of controller modules that have detected errors of the same HDD one or more times, in order to optimize the balance between the reduction of traffic of the transmission channel between the controller modules and the accuracy of determination of HDD malfunction.

Note that the processing function of a device (for example, the control apparatuses 10 and 20, the controller modules 110, 120, 210, 220, 310, and 320) illustrated in each of the above embodiments can be implemented by a computer. In that case, a program that describes procedures of functions of each device is provided and executed in a computer, so that the above processing functions are implemented in the computer. The program that describes the procedures can be stored in a computer-readable storage medium. The computer-readable storage medium is, for example, a magnetic memory device, an optical disc, a magneto-optical storage medium, or a semiconductor memory. The magnetic memory device is, for example, a hard disk device (HDD), a flexible disk (FD), and a magnetic tape. The optical disc is, for example, a digital versatile disc (DVD), a DVD-RAM, a CD-ROM (Compact Disc-Read Only Memory), and a CD-R(Recordable)/RW (ReWritable). The magneto-optical storage medium is, for example, a magneto-optical disk (MO).

In order to put a program in the market, a portable storage medium, such as a DVD and a CD-ROM, storing the program is sold, for example. Also, a program may be stored in a memory device of a server computer to be transmitted from the server computer to other computers via a network.

For example, a computer reads a program stored in a portable storage medium or receives a program transferred from a server computer, in order to store the program in its own memory device and execute the program. Then, the computer reads the program from the memory device and performs processing in accordance with the program. Note that the computer may read the program directly from the portable storage medium and perform processing in accordance with the program. Also, the computer can sequentially perform processing in accordance with a received program, each time a program is transferred from a server computer via a network.

In one aspect, the processing load of an apparatus responsible for management of a memory device accessed from a plurality of control apparatuses can be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
a first memory device that includes a first memory region;
a second memory device that includes a second memory region;
a first control apparatus;
a second control apparatus coupled to the first memory device; and
a third control apparatus coupled to the second memory device,
the first control apparatus includes:
a first memory that stores a first error score and a second error score, and
a first processor that calculates the first error score based on an error detection situation at a time of accessing the first memory region from the first control apparatus through the second control apparatus, stores the calculated first error score in the first memory, calculates the second error score based on an error detection situation at a time of accessing the second memory region from the first control apparatus through the third control apparatus, stores the calculated second error score in the first memory, transmits the first error score to the second control apparatus at a first predetermined time, and transmits the second error score to the third control apparatus at a second predetermined time,
the second control apparatus includes:
a second memory that stores a third error score, and
a second processor that calculates the third error score based on an error detection situation at a time of accessing the first memory region from the second control apparatus, stores the calculated third error score in the second memory, calculates a first value of sum of the first error score received from the first control apparatus and the third error score, and determines whether the first memory device malfunctions based on the first value, and
the third control apparatus includes:
a third memory that stores a fourth error score, and
a third processor that calculates the fourth error score based on an error detection situation at a time of accessing the second memory region from the third control apparatus, stores the calculated fourth error score in the third memory, calculates a second value of sum of the second error score received from the first control apparatus and the fourth error score, and determines whether the second memory device malfunctions based on the second value.

2. The storage system according to claim 1, wherein
the first memory region and the second memory region are allocated as physical memory regions of a logical volume, and
the first processor accesses the first memory region and the second memory region in response to an access request to the logical volume.

3. The storage system according to claim 1, wherein
the first memory also stores a first transfer threshold value and a second transfer threshold value, and
the first processor transmits the first error score to the second control apparatus when the first error score has exceeded the first transfer threshold value, and transmits the second error score to the third control apparatus when the second error score has exceeded the second transfer threshold value.

4. A control apparatus connected to a first another control apparatus and a second another control apparatus, the control apparatus comprising:
a memory that stores a first error score and a second error score; and
a processor that performs a procedure including:
calculating the first error score based on an error detection situation at a time of accessing a first memory region included in a first memory device coupled to the first another control apparatus from the control apparatus through the first another control apparatus,
storing the calculated first error score in the memory,
calculating the second error score based on an error detection situation at a time of accessing a second memory region included in a second memory device coupled to the second another control apparatus from the control apparatus through the second another control apparatus,
storing the calculated second error score in the memory,
transmitting the first error score to the first another control apparatus at a first predetermined time, the first another control apparatus calculates a third error score based on an error detection situation at a time of accessing the first memory region from the first another control apparatus, calculates a first value of sum of the first error score and the third error score, and determines whether the first memory device malfunctions based on the first value, and
transmitting the second error score to the second another control apparatus at a second predetermined time, the second another control apparatus calculates a fourth error score based on an error detection situation at a time of accessing the second memory region from the second another control apparatus, calculates a second value of sum of the second error score and the fourth error score, and determines whether the second memory device malfunctions based on the second value.

5. A non-transitory computer-readable storage medium storing a control program that causes a computer, connected to a first control apparatus and a second control apparatus, to perform a procedure comprising:
accessing a first memory region included in a first memory device coupled to the first control apparatus from the computer through the first control apparatus;
calculating a first error score based on an error detection situation at a time of accessing the first memory region,
storing the calculated first error score in a memory;

accessing a second memory region included in a second memory device coupled to the second control apparatus from the computer through the second control apparatus;

calculating a second error score based on an error detection situation at a time of accessing the second memory region, storing the calculated second error score in the memory;

transmitting the first error score to the first control apparatus at a first predetermined time, the first control apparatus calculates a third error score based on an error detection situation at a time of accessing the first memory region from the first control apparatus, calculates a first value of sum of the first error score and the third error score, and determines whether the first memory device malfunctions based on the first value; and transmitting the second error score to the second control apparatus at a second predetermined time, the second control apparatus calculates a fourth error score based on an error detection situation at a time of accessing the second memory region from the second control apparatus, calculates a second value of sum of the second error score and the fourth error score, and determines whether the second memory device malfunctions based on the second value.

6. A storage system comprising:

a first memory device that includes a first memory region;

a second memory device that includes a second memory region;

a first control apparatus;

a second control apparatus coupled to the first memory device; and a third control apparatus coupled to the second memory device, the first memory region and the second memory region are allocated as physical memory regions of a logical volume, the first control apparatus includes:
  a first memory that stores a first error score and a second error score, and
  a first processor that executes an access process including accessing the first memory region through the second control apparatus, accessing the second memory region through the third control apparatus, and controlling writing to the first memory region and the second memory region by RAID (Redundant Arrays of Independent Disks) in response to a write request to the logical volume, calculates the first error score based on an error detection situation at a time of accessing the first memory region from the first control apparatus through the second control apparatus, stores the calculated first error score in the first memory, calculates the second error score based on an error detection situation at a time of accessing the second memory region from the first control apparatus through the third control apparatus, stores the calculated second error score in the first memory, transmits the first error score to the second control apparatus at a first predetermined time, and transmits the second error score to the third control apparatus at a second predetermined time, the first error score and the second error score each being calculated based on at least a detection situation of errors detected by checking an integrity of data read from a corresponding one of the first memory region and the second memory region, the second control apparatus includes:
  a second memory that stores a third error score, and
  a second processor that calculates the third error score based on an error detection situation at a time of accessing the first memory region from the second control apparatus, the third error score being calculated based on at least a detection situation of errors reported in response to commands to access the first memory region transmitted from the second control apparatus to the first memory device, stores the calculated third error score in the second memory, and determines whether the first memory device malfunctions based on a sum of the first error score received from the first control apparatus and the third error score, and the third control apparatus includes:
  a third memory that stores a fourth error score, and
  a third processor that calculates the fourth error score based on an error detection situation at a time of accessing the second memory region from the third control apparatus, the fourth error score being calculated based on at least a detection situation of errors reported in response to commands to access the second memory region transmitted from the third control apparatus to the second memory device, stores the calculated fourth error score in the third memory, and determines whether the second memory device malfunctions based on a sum of the second error score received from the first control apparatus and the fourth error score.

7. A control apparatus connected to a first another control apparatus and a second another control apparatus, the control apparatus comprising:

a memory that stores a first error score and a second error score; and a processor that performs a procedure including:
  executing an access process including accessing a first memory region through the first another control apparatus, accessing a second memory region through the second another control apparatus, and controlling writing to the first memory region and the second memory region by RAID (Redundant Arrays of Independent Disks) in response to a write request to a logical volume, the first memory region being included in a first memory device coupled to the first another control apparatus, the second memory region being included in a second memory device coupled to the second another control apparatus, the first memory region and the second memory region being allocated as physical memory regions of the logical volume, calculating the first error score based on an error detection situation at a time of accessing the first memory region from the control apparatus through the first another control apparatus, storing the calculated first error score in the memory, calculating the second error score based on an error detection situation at a time of accessing the second memory region from the control apparatus through the second another control apparatus, storing the calculated second error score in the memory, transmitting the first error score to the first another control apparatus at a first predetermined time, the first another control apparatus calculating a third error score based on an error detection situation at a time of accessing the first memory region from the first another control apparatus and determining whether the first memory device malfunctions based on a sum of the first error score and the third error score, and transmitting the second error score to the second another control apparatus at a second predetermined time, the second another control apparatus calculating a fourth error score based on an error detection situation at a time of accessing the second memory region from the second another control apparatus and determining whether the second memory device malfunctions based on a sum of the second error score and the fourth error score, the first error score and the second error score are each calculated based on at least a detection situation of errors detected by checking an integrity of data read from a corresponding one of the first memory region and the second memory region, the third error score is calculated based on at least a detection situation of errors reported in response to commands to access the first memory region transmitted from the first another control apparatus to the first memory device, and the fourth error score is calculated based on at least a detection situation of errors reported in response to commands to access the second memory region transmitted from the second another control apparatus to the second memory device.

8. A non-transitory computer-readable storage medium storing a control program that causes a computer, connected to a first control apparatus and a second control apparatus, to perform a procedure comprising:

executing an access process including accessing a first memory region through the first control apparatus, accessing a second memory region through the second control apparatus, and controlling writing to the first memory region and the second memory region by RAID (Redundant Arrays of Independent Disks) in response to a write request to a logical volume, the first memory region being included in a first memory device coupled to the first control apparatus, the second memory region being included in a second memory device coupled to the second control apparatus, the first memory region and the second memory region being allocated as physical memory regions of the logical volume, calculating a first error score based on an error detection situation at a time of accessing the first memory region, storing the calculated first error score in a memory;

calculating a second error score based on an error detection situation at a time of accessing the second memory region, storing the calculated second error score in the memory;

transmitting the first error score to the first control apparatus at a first predetermined time, the first control apparatus calculating a third error score based on an error detection situation at a time of accessing the first memory region from the first control apparatus and determining whether the first memory device malfunctions based on a sum of the first error score and the third error score; and transmitting the second error score to the second control apparatus at a second predetermined time, the second control apparatus calculating a fourth error score based on an error detection situation at a time of accessing the second memory region from the second control apparatus and determining whether the second memory device malfunctions based on a sum of the second error score and the fourth error score, the first error score and the second error score are each calculated based on at least a detection situation of errors detected by checking an integrity of data read from a corresponding one of the first memory region and the second memory region, the third error score is calculated based on at least a detection situation of errors reported in response to commands to access the first memory region transmitted from the first control apparatus to the first memory device, and the fourth error score is calculated based on at least a detection situation of errors reported in response to commands to access the second memory region transmitted from the second control apparatus to the second memory device.

* * * * *